US006517627B1

(12) United States Patent
Atarashi et al.

(10) Patent No.: US 6,517,627 B1
(45) Date of Patent: *Feb. 11, 2003

(54) ADDITIVE PIGMENT POWDERS

(75) Inventors: Takafumi Atarashi, Tokyo (JP); Katsuto Nakatsuka, 3-5-1403, Moniwadai 4-chome, Taihaku-ku, Sendai-shi, Miyagi (JP)

(73) Assignees: Nittetsu Mining Co., Ltd., Tokyo (JP); Katsuto Nakatsuka, Miyagi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,670

(22) PCT Filed: Aug. 20, 1997

(86) PCT No.: PCT/JP97/02894

§ 371 (c)(1), (2), (4) Date: Mar. 22, 1999

(87) PCT Pub. No.: WO98/07791

PCT Pub. Date: Feb. 26, 1998

(30) Foreign Application Priority Data

Aug. 23, 1996 (JP) .............................. 8-222783

(51) Int. Cl.$^7$ .............................. C09C 1/00; C09C 1/04; C09C 1/22; C09C 1/28; C09C 1/36
(52) U.S. Cl. ................... 106/401; 106/415; 106/417; 106/425; 106/431; 106/436; 428/404
(58) Field of Search ................... 106/401, 415, 106/417, 425, 431, 436; 428/404

(56) References Cited

U.S. PATENT DOCUMENTS

| 3,087,828 A | * | 4/1963 | Linton et al. ............... 106/417 |
| 4,242,428 A | * | 12/1980 | Davis ........................... 430/9 |
| 4,954,175 A | * | 9/1990 | Ito et al. ..................... 106/417 |
| 5,958,125 A | * | 9/1999 | Schmid et al. .............. 106/417 |

FOREIGN PATENT DOCUMENTS

| JP | 63-239461 | 10/1988 | ............ G03G/9/08 |
| JP | 2-124981 | 5/1990 | ............ C09C/1/62 |
| JP | 7-258025 | 10/1995 | ............ A61K/7/02 |
| JP | 9-11638 | 1/1997 | ............ B41M/5/30 |

OTHER PUBLICATIONS

International Search Report.
English Translation of International Preliminary Examination Report including Forms PCT/IB/338 and PCT/IPEA/409.
Notification of the Recording of a Change (Form PCT/IB/306).

* cited by examiner

Primary Examiner—C. Melissa Koslow
(74) Attorney, Agent, or Firm—Sughrue Mion, PLLC

(57) ABSTRACT

Additive pigments having a box-shape spectral distribution are provided. These pigments are characterized in that they are pigment powders which respectively have a high reflectance in the regions corresponding to the three primary colors of light, and comprise three pigments respectively having the three primary colors of light (red, green, and blue), and that when these pigments of the three colors are mixed together, each pigment is subjected to additive color mixing.

6 Claims, 5 Drawing Sheets

RED R

GREEN G

BLUE-VIOLET B

↓ : PEAK POSITION

TRANSMITTANCE OF
TRICHROMATIC SEPARATION FILTER

ADDITIVE PIGMENT POWDERS

TECHNICAL FIELD

The present invention relates to a pigment powder. More particularly, the present invention relates to a pigment powder having thereon a multilayered film which is usable as a retroreflective pigment, a weather resistant pigment, or the like for use as a raw material for a magnetic color toner, a magnetic color inks, or the like.

BACKGROUND ART

The conventional pigments for use in printing inks or copying colorants and the conventional dyes for use in dyeing each is a subtractive colorant and assumes a dark color upon color mixing. No additive pigment has been proposed so far. An additive pigment is a pigment which functions as a false light source upon irradiation with light and gives white light upon color mixing.

In the additive process, the three primary colors of R (red), G (green), and B (blue) are used as bases, and colors are produced by using various mixing ratios among these.

It is known that mixing these three primary colors gives white light.

The television tube, which is a representative of additive-process apparatuses, performs color displays based on the same color mixing.

However, additive pigments capable of developing colors based on such combinations of the three primary colors have not been realized.

Ideal white light has a spectral distribution in which the intensity has the same height throughout the wavelength range of 380 nm to 780 nm, namely, it has a distribution of, so to speak, a box shape. Natural light is considerably close to white light having a box-shape distribution.

On the other hand, ideal red light is a light having a box-shape spectral distribution in the wavelength range of 580 nm to 680 nm; ideal green light is a light having a box-shape spectral distribution in the wavelength range of 480 nm to 580 nm; and ideal violet light is a light having a box-shape spectral distribution in the wavelength range of 380 nm to 480 nm. However, virtually no pigment or dye having any of the above-described box-shape distributions has been obtained so far. Consequently, the artificial lights which have passed through filters comprising conventional colorants have bell-shape spectral distributions, in which bottom parts of the spectral curves for the three primary colors overlap with each other and which have peaks. This applies to spectra of the three primary colors in prints, photographic positives, and photographic negatives (see FIG. 4).

Superposing red light on green light gives yellow; superposing green light on violet light gives cyan light; and superposing violet light on red light gives magenta light.

The present inventors previously investigated a method for forming a dense continuous metal oxide film on the surface of a powder by dispersing the powder into a solution of a metal alkoxide and hydrolyzing the metal alkoxide in the presence of the powder. Using this technique, the present inventors developed the following and other methods: a method for forming a multilayered metal oxide coating film on the surface of a powder made of a metal or metal oxide; a method for obtaining a powder coated with a multilayered metal oxide film, for example, by forming a silica film having a thickness of 0.01 to 0.2 µm on the surface of a powder made of a metal or metal oxide and further forming thereon a titania film having a thickness of 0.01 to 0.2 µm (JP-A-6-238604); and a method for obtaining a powder coated with a metal film and a metal oxide film by depositing a metal film alternately with a metal oxide film on the surface of a powder, specifically, for example, by forming a coating film of silver metal having a thickness of 0.01 to 0.02 µm on the surface of a powder and forming thereon a titania film having a thickness of 0.04 to 0.6 µm (JP-A-7-90310).

In forming either metal oxide films or at least one metal film and at least one metal oxide film on a powder by any of the techniques described in the aforementioned patent gazettes, a powder having a peak at a specific wavelength, i.e., at the wavelength determined by the product of the refractive index of a high-refractive-index coating film and the thickness thereof, could be obtained by forming neighboring films differing from each other in refractive index, for example, by superposing a high-refractive-index film alternately with a low-refractive-index film.

In the case of the method described above, it is thought that when the difference in refractive index between the high-refractive-index film and the low-refractive-index film is very large, then a pigment having a high reflectance is obtained by depositing the low-refractive-index film on the high-refractive-index film. A pigment having properties close to those of additive pigments is expected to be produced by further heightening the reflectance. Virtually, however, the pigment thus obtained had a spectral distribution which was not of a box shape.

Especially in the case of a black base powder, it is difficult to obtain a reflected light having a box-shape spectral distribution by the coating method in which a high-refractive-index coating film and a low-refractive-index coating film are deposited alternately, although a monochromatic reflected light having a reflection waveform with a narrow peak is obtainable.

For transparent bases, a technique of retroreflectively coloring a powder has been used in which a light of specific wavelengths is caused to pass through and a light having wavelengths outside that transmission wavelength range is reflected. However, in this case also, a box-shape spectral distribution is difficult to obtain because heightening the reflectance of the powder is not easy.

Accordingly, an object of the present invention is to provide an additive pigment having a box-shape spectral distribution. Another object of the present invention is to provide additive pigments which respectively have a high reflectance in regions corresponding to the three primary colors of light and each has a box-shape spectral distribution.

These objects of the present invention are accomplished with the following pigment powders of the present invention.

(1) An additive pigment powder comprising three pigments respectively having the three primary colors of light (red, green, and blue), wherein when the pigment powders of the three colors are mixed together, each pigment powder is subjected to additive color mixing.

(2) The additive pigment powder according to the above (1), wherein the pigment particles having the three primary color of light reflect a visible light only in a wavelength range corresponding to the color selectively and intensively, and a desired bright intermediate color can be developed by mixing these pigment particles having the three primary colors in an appropriate proportion.

(3) An additive pigment powder having blue color among the three primary colors of light, which has a peak having a light reflectance of 80% or higher in a spectral wavelength range of 380 nm to 500 nm, and has a reflection range having a light reflectance of 80% or higher in 30 to 50 nm at the both sides of the peak wavelength.

(4) An additive pigment powder having green color among the three primary colors of light, which has a peak having a light reflectance of 80% or higher in a spectral wavelength range of 500 nm to 575 nm, and has a reflection range having a light reflectance of 80% or higher in 30 to 50 nm at the both sides of the peak wavelength.

(5) An additive pigment powder having red color among the three primary colors of light, which has a peak having a light reflectance of 80% or higher in the spectral wavelength range of 575 nm to 750 nm, and has a reflection range having a light reflectance of 80% or higher in 30 to 50 nm at the both sides of the peak wavelength.

(6) The additive pigment powder according to any one of the above (1) to (5), wherein the pigment powder comprises a base particle having thereon a multilayered film, and any adjacent films of the multilayered film and the base particle differ from each other in material and in refractive index to make the pigment particle have a color due to interference of waves reflected or transmitted by between the films of the multilayered film.

The pigment powders of the present invention described above are produced by the following processes.

(7) A process for producing a multilayer-coated pigment powder which constitute any of the pigment powders described above, comprising coating the surface of a base particle with plural coating layers, and coating a metal compound to form at least one of the plural coating layers.

(8) A process for producing a multilayer-coated pigment powder which constitute any of the pigment powders described above, comprising coating the surface of a base particle with plural coating layers, and coating a metal to form at least one of the plural coating layers.

As the base particles of the additive pigment powders of the present invention, use can be made of a black base, a white base, or a transparent base. However, it is preferred to use a black base as base particles from the standpoint of obtaining an additive pigment having a bright color attributable to reflected light. In the case of using a white base as base particles, it is preferred to employ such a coating film constitution that the spectral components other than a coloring spectrum are absorbed by the coating film to thereby cause the spectral components other than the absorbed ones to be reflected by the cores.

For designing a coating film constitution necessary for producing a pigment powder of the present invention, it is insufficient to use the conventionally known methods for forming coating layers on a powder (base particles), i.e., the methods described in JP-A-6-238604 and JP-A-7-90310. Merely forming a high-refractive-index film alternately with a low-refractive-index film is unnecessary, and it is necessary to regulate the thickness and refractive index of each coating film and to design a coating film constitution so as to have a box-shape spectral distribution in a specific wavelength range by combining coating films each regulated in thickness and refractive index.

The range of coating film refractive indexes required for the above design is wide, and the range of the refractive indexes of prior art metal films and metal oxide films is insufficient for the design. This is because there are differences of at least 0.2 between the refractive indexes of the prior art metal films and metal oxide films and the refractive indexes of coating films necessary for producing additive pigments which realize colors respectively having box-shape distributions over a spectral wavelength range of 380 nm to 780 nm, and this difference cannot be compensated for by the regulation of coating film thicknesses. Formation of coating films for the above purpose will be explained later in detail.

FIG. 1 shows a sectional view of one example of an additive pigment according to the present invention. Numeral 1 denotes a powder particle serving as a core; numeral 2 denotes a coating film having a refractive index of $n_1$ (first and third layers); and numeral 3 denotes a coating film having a refractive index of $n_2$ (second and fourth layers).

The pigment powder of the present invention is preferably constituted of the following three pigment powders: (i) a pigment powder having blue color among the three primary colors of light, which has a peak having a light reflectance of 80% or higher in the spectral wavelength range of 380 nm to 500 nm, and has a reflection range having a light reflectance of 80% or higher in 30 to 50 nm at the both sides of the peak wavelength; (ii) a pigment powder having green color among the three primary colors of light, which has a peak having a light reflectance of 80% or higher in the spectral wavelength range of 500 nm to 575 nm, and has a reflection range having a light reflectance of 80% or higher in 30 to 50 nm at the both sides of the peak wavelength; and (iii) a pigment powder having red color among the three primary colors of light, which has a peak having a light reflectance of 80% or higher in the spectral wavelength range of 575 nm to 750 nm, and has a reflection range having a light reflectance of 80% or higher in 30 to 50 nm at the both sides of the peak wavelength. A powder composed of these pigment powders is a pigment of an exceedingly bright white color.

However, in the case of a pigment powder of a blue color, for example, it is difficult to obtain a single pigment having an intensity which is evenly high throughout that wavelength range. In such a case, the desired pigment powder may be obtained by producing two or more pigments of similar colors and mixing these. Specifically, in the above method, a blue pigment powder, for example, is constituted of blue pigments having three distributions respectively having a peak ranging from a wavelength of 380 nm to 420 nm, a peak ranging from a wavelength of 420 nm to 450 nm, and a peak ranging from a wavelength of 450 nm to 490 nm (see FIG. 3).

In forming two or more layers of a metal oxide film and a metal film on the surface of the powder, a special function can be imparted by regulating the thickness of each film layer. For example, in the case where coating films differing in refractive index are alternately deposited on the surface of an object, the coating films reflect or absorb incident light having a specific wavelength ($\lambda$) when each coating layer is regulated so that the product of the refractive index n of the coating layer and the thickness d of the layer satisfies the following equation (1).

Each coating film reflects or absorbs when m in equation (1) is an odd number or an even number, respectively.

Using a powder which has two or more layers of a metal oxide film and a metal film so as to take advantage of the above function, a colorant is provided which has a specific reflection or absorption wavelength width in the visible light region.

$$n_i d = m\lambda/4 \qquad (1)$$

wherein m is a natural number; λ is a peak wavelength; d is the film thickness; and $n_t$ is the complex refractive index of the film, which is represented by the following equation (2):

$$n_t = n + i\kappa \quad (2)$$

wherein n is the actual refractive index of the film; κ is an extinction coefficient of the film; and i is a complex number.

The sequence of the deposition of coating films on the surface of a powder is as follows. When the base particles have a high refractive index, it is preferred to deposit a layer having a low refractive index as the first layer, followed by one or more layers in order of their increasing refractive index. When the base particles have a low refractive index, it is preferred to deposit a layer having a high refractive index, followed by one or more layers in order of their decreasing refractive index. In the latter case, however, conditions for the reflection of incident light at each layer interface should be sufficiently taken in account.

The thickness of each of metal oxide and metal films to be deposited on the surface of a powder is controlled based on a measurement in which the change of the optical film thickness, which is the product of the refractive index n of the coating film layer and the layer thickness d, is determined as reflection waveform with a spectrophotometer or the like. The thickness of each layer is designed so that the reflection waveform conforms to the finally required waveform, preferably so as to form a box-shape spectral distribution.

A box-shape spectral distribution can be formed by regulating the unit coating films constituting a multilayered film so as to respectively have reflection waveforms in different positions as shown in FIG. 3. However, in the case of an actual powder, a design should be made while taking account of the particle diameter and shape of the powder, the phase shifts occurring at coating film/base particle interfaces and occurring at interfaces between the coating films, the peak shift attributable to the wavelength dependence of refractive index, etc. For reference, one example of spectral curves of a commercial trichromatic separation filter is shown in FIG. 4.

In the case of a powder composed of spherical particles, the light which has struck on each particle and has been reflected causes complicated interference. The resultant interference waveforms are almost the same as on plane plates when the number of coating films is small. However, as the number of coating films increases, the interference within the multilayered film becomes complicated. In the case of such multilayer coating also, a spectral reflection curve can be designed beforehand based on Fresnel interference through a computer simulation so as to result in an optimal film thickness constitution.

As described above, the peak position for each of the unit coating films constituting a multilayered film can be regulated by changing the thickness of the coating film. The thickness of each coating film can be regulated by regulating the concentration of a starting material or reaction conditions during coating film formation. Thus, the thickness of each layer is designed so as to form a box-shape spectral distribution.

In the present invention, not only a powder made of an inorganic substance but also a powder made of an organic substance can be used as the powder serving as the cores of the above-described multilayer-coated powder of the present invention. Examples of the inorganic substance constituting the inorganic powder of the present invention include metals, such as iron, nickel, chromium, titanium, aluminum, and the like; metal alloys, such as iron-nickel, iron-cobalt alloys, and the like; iron-nickel alloy nitrides; and iron-nickel-cobalt alloy nitrides. Examples of the metal oxides include oxides of iron, nickel, chromium, titanium, aluminum, and silicon, oxides of calcium, magnesium, and barium, and composite oxides thereof; clays; and glasses.

One of the objects of the present invention is to produce a powder having magnetic properties, such as those for use in magnetic color toners and magnetic color inks. In this case, a ferromagnetic material is preferably used as a powder serving as the cores of a multilayer-coated powder of the present invention. Although the ferromagnetic material may be a metal having a high magnetic permeability, such as iron, nickel, chromium, titanium, aluminum, and the like, use can also be made of ferromagnetic oxides and ferromagnetic alloys, such as ferrite, γ-iron oxide, and the like.

In the present invention, a powder made of an organic substance of the present invention can be used as stated above. Examples of the organic substance constituting the organic powder of the present invention include natural and synthetic polymeric compounds. Examples of the synthetic polymeric compounds include polystyrene, polyethylene, polypropylene, polyacrylic esters, polymethacrylic esters, and copolymers of any of the monomers constituting these polymers with other monomer(s). Examples of the natural polymeric compounds include starch, agarose, cellulose, and gelatin. Also usable beside these are semisynthetic polymeric compounds such as acetyl cellulose and hydroxyethyl cellulose. Powders of those organic polymeric compounds may be composed of particles of irregular shapes. However, a powder is preferred which is composed of spherical particles formed by the suspension polymerization or seed polymerization method or by the solution dispersion method, or the like.

Although the particle diameter of the powder is not particularly limited, it is preferably from 0.01 μm to several millimeters, more preferably from 0.01 μm to 0.1 mm.

Examples of metal oxides which constitute coating films in the present invention include oxides of iron, nickel, chromium, titanium, zinc, aluminum, cadmium, zirconium, and silicon; and oxides of calcium, magnesium, and barium. Metal oxides suitable for the properties to be imparted to the surface of a powder for producing a pigment of the present invention are selected. The thickness of each metal oxide film is from 0.03 to 20 μm. In forming two or more layers, a first metal oxide film is formed on the surface of a powder serving as cores and, thereafter, a second coating film is formed thereon by depositing a metal oxide film in which the metal oxide is the same as or different from that in the first film. The second coating film may be a metal film or may be a resin layer according to need. This applies to the third and any subsequent layers.

As already stated hereinabove, the range of the refractive indexes of the metal films and metal oxide films which can be formed by the conventionally known methods described in JP-A-6-238604 and JP-A-7-90310 is insufficient for design. This is because there are differences of at least 0.2 between the refractive indexes of the prior art metal films and metal oxide films and the refractive indexes of coating films necessary for producing additive pigments which realize colors respectively having box-shape distributions over a spectral wavelength range of from 380 nm to 780 nm, and this difference cannot be compensated for by the regulation of coating film thicknesses. Because of this, metal chalcogenides, such as metal sulfides, metal tellurides, metal selenides, and the like, are used for high-refractive-index films. For low-refractive-index films, use is made of phosphates or halides, especially fluorides. Also usable are metal carbonates. Thus, there is an even wider choice of refractive indexes.

Among methods usable in the present invention for depositing a metal oxide film on the surface of base particles are the methods described in JP-A-6-228604 and JP-A-7-90310. These methods comprise dispersing a powder of base particles into a solution of a metal alkoxide (the solvent is mostly an organic solvent or an organic solvent/water mixed solvent) and adding either water or a weakly alkaline aqueous solution to the solution containing the powder dispersed therein to hydrolyze the metal alkoxide to thereby form a film of a hydroxide or oxide of the metal on the surface of the powder. This method is called a sol-gel method, and is effective in forming an oxide having a fine, homogeneous, and dense composition.

Another method usable in the present invention for depositing a metal oxide film on the surface of base particles comprises immersing the base particles in an aqueous solution of a metal salt and depositing a metal hydroxide film or metal oxide film on the base particles by means of neutralization or heating. This method brings about a wider choice of refractive index ranges than that obtained with the sol-gel method. However, since this method denatures the surface of the base particles or may cause the denaturation, care should be taken in forming a metal film or metal oxide film as the first layer.

The thus-obtained powder having metal coating films or metal oxide coating films is dried and then subjected to a high-temperature heat treatment, whereby a powder coated with stabler metal or metal oxide films can be obtained.

BEST MODES FOR CARRYING OUT THE INVENTION

Figure 1:
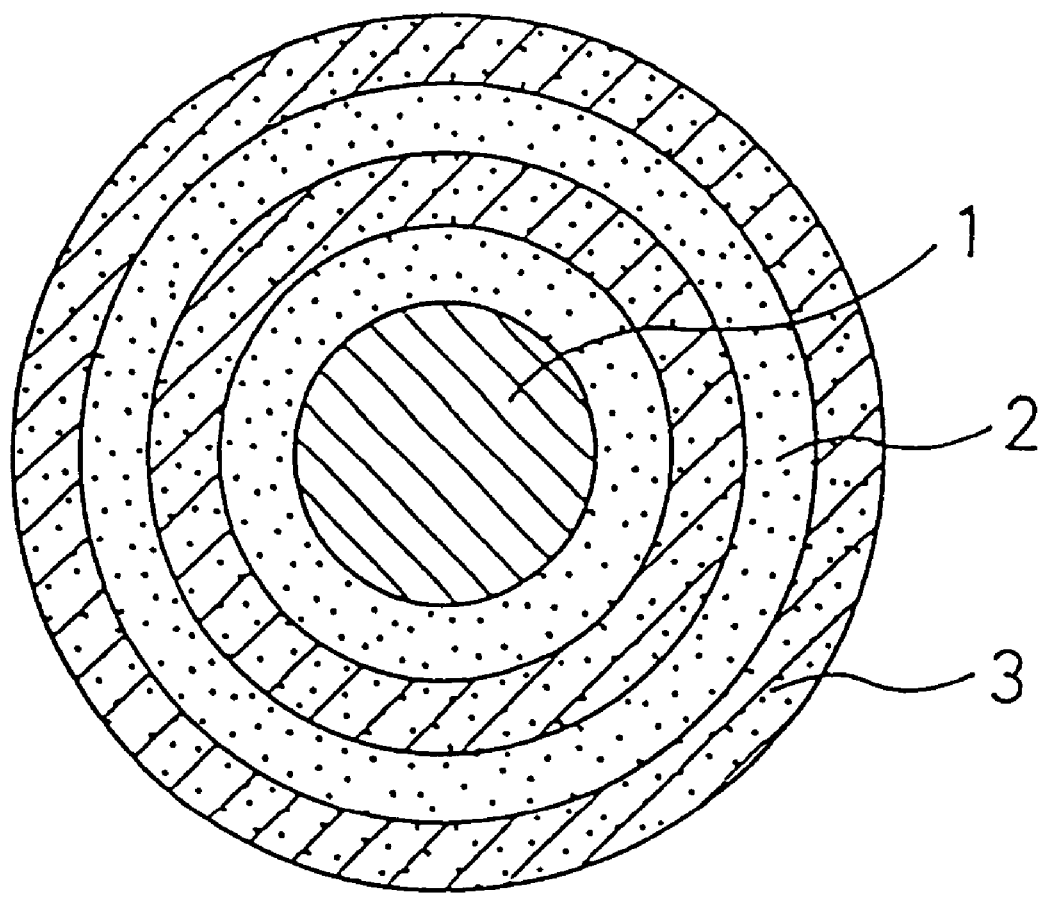
FIG. 1 is a view illustrating a section of one example of a particle of an additive pigment powder according to the present invention; numeral 1 denotes a pigment powder particle; numeral 2 denotes a coating film having a refractive index of $n_1$; and numeral 3 denotes a coating film having a refractive index of $n_2$.
Figure 2:
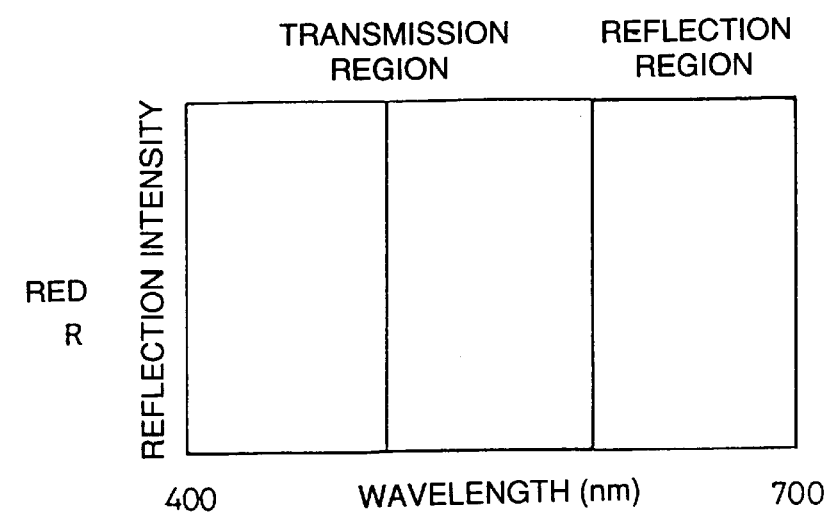
FIG. 2 shows drawings illustrating ideal spectral curves for retroreflective pigments according to the present invention; R, G, and B are spectral curves for red, green, and violet, respectively.
Figure 2:
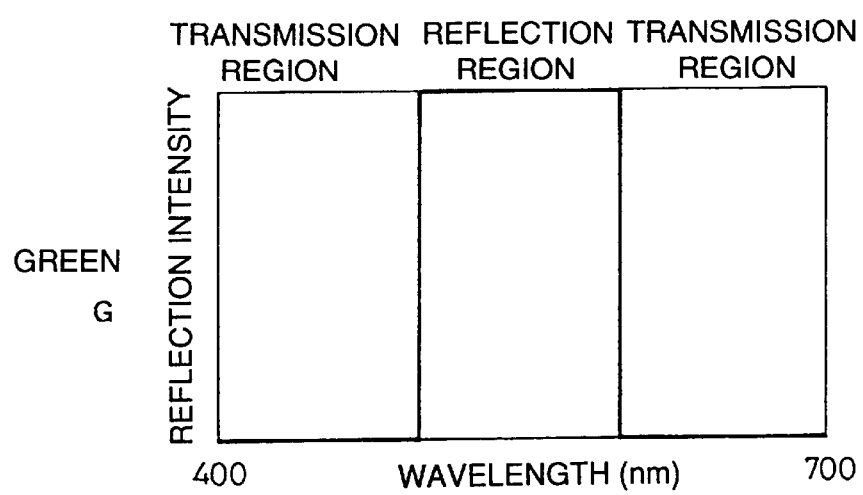
Figure 2:
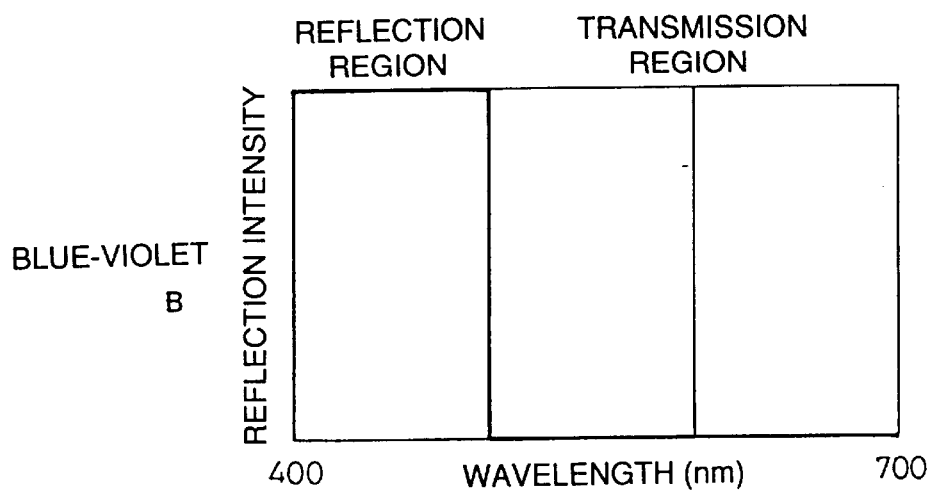
Figure 3:
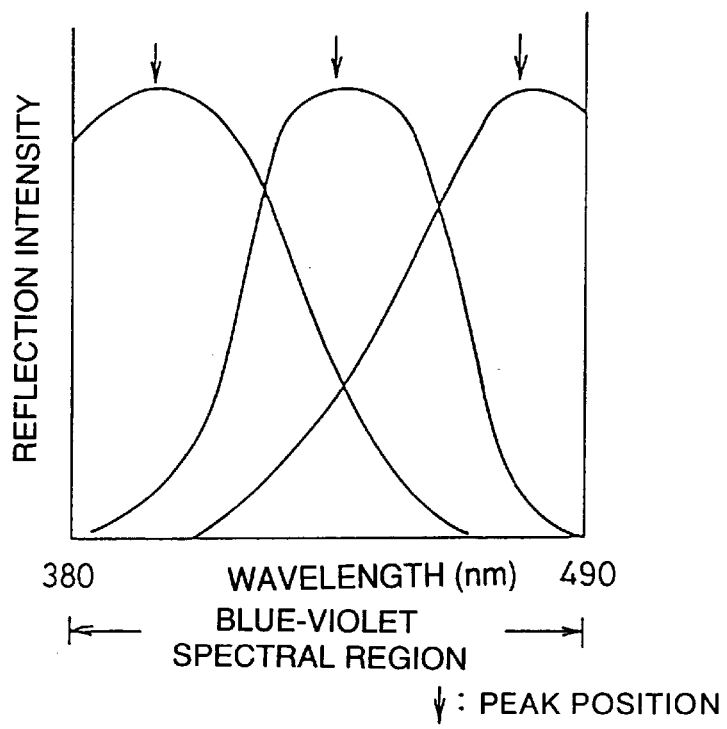
FIG. 3 is a drawing showing one example of spectral curves of a violet pigment according to the present invention.
Figure 4:
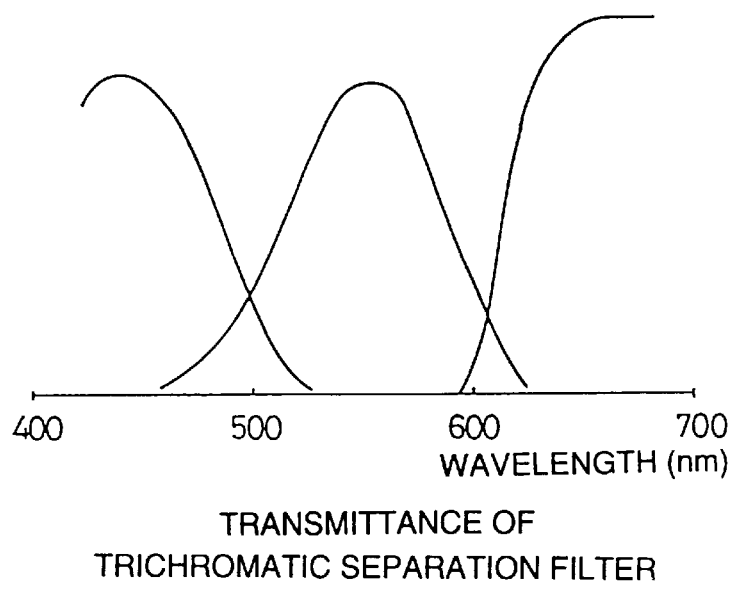
FIG. 4 is a drawing showing one example of spectral curves of a commercial trichromatic separation filter.

Examples of processes for producing a multilayer-coated powder comprising a powder having metal oxide films on the surface will be explained below. However, the present invention should not be construed as being limited by the following Examples.

EXAMPLE 1

Primary color of light 1: blue:
First layer: Titania film:

Into 2,478 g of ethanol was dispersed 100 g of a powder of spherical glass particles (average particle diameter, 2 μm) together with 37.5 g of titanium ethoxide. While the contents and the vessel were held at 25° C., a solution prepared beforehand by mixing 37.5 g of deionized water with 118 g of ethanol was added dropwise to the above solution with stirring over 1 hour. Thereafter, the resultant mixture was reacted for 6 hours.

After completion of the reaction, the solid matter was washed with a sufficient amount of ethanol with decantation, taken out by filtration, subsequently vacuum-dried at 180° C. for 8 hours, and then heated with a rotary tubular oven at 500° C. for 30 minutes.

As a result, titania-coated glass powder B was obtained.

Second layer: Silica film:

To 100 g of the titania-coated glass powder B was added 793 g of ethanol to disperse the powder. Thereto were added 30 g of silicon ethoxide, 36 g of ammonia water (29%), and 40 g of water. The resultant mixture was reacted for 6 hours with stirring. After completion of the reaction, the solid matter was washed with a sufficient amount of ethanol with decantation, taken out by filtration, subsequently vacuum-dried at 180° C. for 8 hours, and then heated with a rotary tubular oven at 500° C. for 30 minutes.

The titania film coating and silica film coating described above were alternately conducted repeatedly together with the heat treatment while changing conditions as shown in Tables 1-1 and 1-2 to thereby form eleven films in total composed of six titania films and five silica films.

The powder obtained had a reflection peak at 450 nm with a reflectance of 92%, and had a spectral curve shown in FIG. 5B.

The refractive index and thickness of each layer which were determined through computer calculations are shown in Table 1-3.

TABLE 1-1

Starting material composition for blue powder (titania layer)

| | Powder (g) | Ethanol (g) | TEOT (g) | Dropped solution | |
|---|---|---|---|---|---|
| | | | | Ethanol (g) | Deionized water (g) |
| 1st Layer | 100 | 2478 | 37.5 | 118 | 37.5 |
| 3rd Layer | 100 | 2478 | 38.5 | 118 | 38.5 |
| 5th Layer | 100 | 2478 | 39.6 | 118 | 39.6 |
| 7th Layer | 100 | 2478 | 40.6 | 118 | 40.6 |
| 9th Layer | 100 | 2478 | 41.7 | 118 | 41.7 |
| 11th Layer | 100 | 2478 | 42.7 | 118 | 42.7 |

TABLE 1-2

Starting material composition for blue powder (silica layer)

| | Powder (g) | Ethanol (g) | TEOT (g) | Dropped solution | |
|---|---|---|---|---|---|
| | | | | Ammonia water (g) | Deionized water (g) |
| 2nd Layer | 100 | 793 | 30 | 36 | 40 |
| 4th Layer | 100 | 793 | 30 | 37 | 40 |
| 6th Layer | 100 | 793 | 30 | 38 | 40 |
| 8th Layer | 100 | 793 | 30 | 39 | 40 |
| 10th Layer | 100 | 793 | 30 | 40 | 40 |

TABLE 1-3

Thickness and refractive index of each layer in blue powder

|  | Thickness (nm) | Refractive index |  | Thickness (nm) | Refractive index |
|---|---|---|---|---|---|
| 1st Layer | 50.1 | 2.1 | 7th Layer | 52.2 | 2.1 |
| 2nd Layer | 73.6 | 1.45 | 8th Layer | 76.6 | 1.45 |
| 3rd Layer | 51.0 | 2.1 | 9th Layer | 52.9 | 2.1 |
| 4th Layer | 74.6 | 1.45 | 10th Layer | 77.6 | 1.45 |
| 5th Layer | 51.8 | 2.1 | 11th Layer | 53.6 | 2.1 |
| 6th Layer | 75.6 | 1.45 |  |  |  |

EXAMPLE 2

Primary color of light 2: green:
First layer: Titania film:

Into 2,478 g of ethanol was dispersed 100 g of a powder of spherical glass particles (average particle diameter, 2 $\mu$m) together with 45.8 g of titanium ethoxide. While the contents and the vessel were held at 25° C., a solution prepared beforehand by mixing 45.8 g of deionized water with 118 g of ethanol was added dropwise to the above solution with stirring over 1 hour. Thereafter, the resultant mixture was reacted for 6 hours.

After completion of the reaction, the solid matter was washed with a sufficient amount of ethanol with decantation, taken out by filtration, subsequently vacuum-dried at 180° C. for 8 hours, and then heated with a rotary tubular oven at 500° C. for 30 minutes.

As a result, titania-coated glass powder G was obtained.
Second layer: Silica film:

To the titania-coated glass powder G was added 793 g of ethanol to disperse the powder. Thereto were added 30 g of silicon ethoxide, 45.2 g of ammonia water (29%), and 40 g of water. The resultant mixture was reacted for 6 hours with stirring. After completion of the reaction, the solid matter was washed with a sufficient amount of ethanol with decantation, taken out by filtration, subsequently vacuum-dried at 180° C. for 8 hours, and then heated with a rotary tubular oven at 500° C. for 30 minutes.

The titania film coating and silica film coating described above were alternately conducted repeatedly together with the heat treatment while changing conditions as shown in Tables 2-1 and 2-2 to thereby form eleven films in total composed of six titania films and five silica films.

Figure 5:
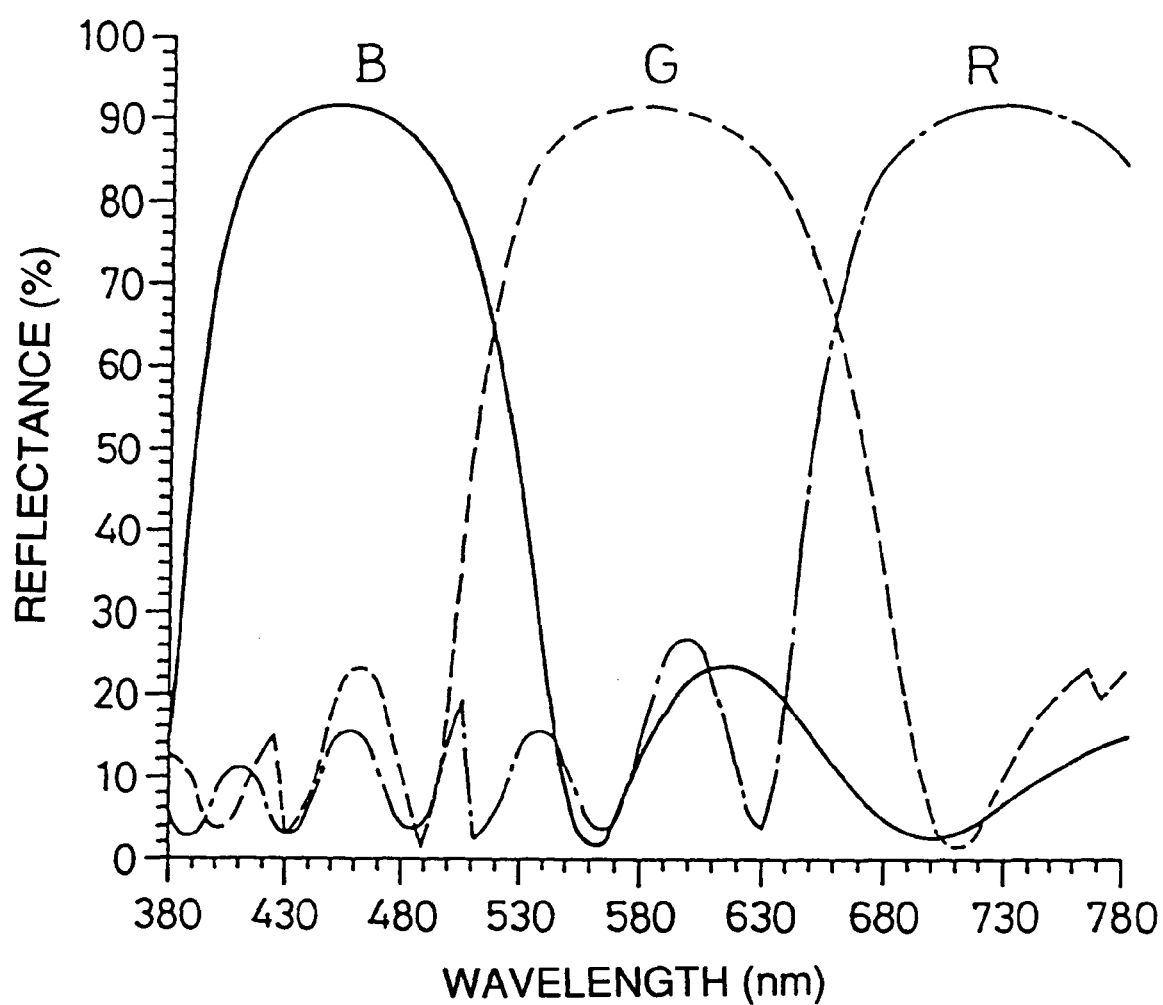
FIG. 5 is a drawing showing spectral curves of the pigments respectively obtained in Examples 1 to 3 according to the present invention.

The powder obtained had a reflection peak at 580 nm with a reflectance of 92%, and had a spectral curve shown in FIG. 5 G.

The refractive index and thickness of each layer which were determined through computer calculations are shown in Table 2-3.

TABLE 2-1

Starting material composition for green powder (titania layer)

|  |  |  |  | Dropped solution |  |
|---|---|---|---|---|---|
|  | Powder (g) | Ethanol (g) | TEOT (g) | Ethanol (g) | Deionized water (g) |
| 1st Layer | 100 | 2478 | 45.8 | 118 | 45.8 |
| 3rd Layer | 100 | 2478 | 47.3 | 118 | 47.3 |
| 5th Layer | 100 | 2478 | 48.8 | 118 | 48.8 |
| 7th Layer | 100 | 2478 | 50.4 | 118 | 50.4 |
| 9th Layer | 100 | 2478 | 52.1 | 118 | 52.1 |
| 11th Layer | 100 | 2478 | 53.8 | 118 | 53.8 |

TABLE 2-2

Starting material composition for green powder (silica layer)

|  |  |  |  | Dropped solution |  |
|---|---|---|---|---|---|
|  | Powder (g) | Ethanol (g) | TEOT (g) | Ammonia water (g) | Deionized water (g) |
| 2nd Layer | 100 | 793 | 30 | 45.2 | 40 |
| 4th Layer | 100 | 793 | 30 | 46.8 | 40 |
| 6th Layer | 100 | 793 | 30 | 48.3 | 40 |
| 8th Layer | 100 | 793 | 30 | 50.0 | 40 |
| 10th Layer | 100 | 793 | 30 | 50.9 | 40 |

TABLE 2-3

Thickness and refractive index of each layer in green powder

|  | Thickness (nm) | Refractive index |  | Thickness (nm) | Refractive index |
|---|---|---|---|---|---|
| 1st Layer | 61.9 | 2.1 | 7th Layer | 64.7 | 2.1 |
| 2nd Layer | 89.6 | 1.45 | 8th Layer | 94.1 | 1.45 |
| 3rd Layer | 62.8 | 2.1 | 9th Layer | 65.4 | 2.1 |
| 4th Layer | 91.1 | 1.45 | 10th Layer | 95.7 | 1.45 |
| 5th Layer | 63.8 | 2.1 | 11th Layer | 66.1 | 2.1 |
| 6th Layer | 92.6 | 1.45 |  |  |  |

EXAMPLE 3

Primary color of light: red:
First layer: Titania film:

Into 2,478 g of ethanol was dispersed 100 g of a powder of spherical glass particles (average particle diameter, 2 $\mu$m) together with 54.2 g of titanium ethoxide. While the contents and the vessel were held at 25° C., a solution prepared beforehand by mixing 54.2 g of deionized water with 118 g of ethanol was added dropwise to the above solution with stirring over 1 hour. Thereafter, the resultant mixture was reacted for 6 hours.

After completion of the reaction, the solid matter was washed with a sufficient amount of ethanol with decantation, taken out by filtration, subsequently vacuum-dried at 180° C. for 8 hours, and then heated with a rotary tubular oven at 500° C. for 30 minutes.

As a result, titania-coated glass powder R was obtained.
Second layer: Silica film To 100 g of the titania-coated glass powder R was added 793 g of ethanol to disperse the powder. Thereto were added 30 g of silicon ethoxide, 64.4 g of ammonia water (29%), and 40 g of water. The resultant mixture was reacted for 6 hours with stirring. After completion of the reaction, the solid matter was washed with a sufficient amount of ethanol with decantation, taken out by filtration, subsequently vacuum-dried at 180° C. for 8 hours, and then heated with a rotary tubular oven at 500° C. for 30 minutes.

The titania film coating and silica film coating described above were alternately conducted repeatedly together with the heat treatment while changing conditions as shown in Tables 3-1 and 3-2 to thereby form eleven films in total composed of six titania films and five silica films.

The powder obtained had a reflection peak at 725 nm with a reflectance of 92%, and had a spectral curve shown in FIG. 5 R.

The refractive index and thickness of each layer which were determined through computer calculations are shown in Table 3-3.

TABLE 3-1

Starting material composition for red powder (titania layer)

|  | Powder (g) | Ethanol (g) | TEOT (g) | Dropped solution | |
|---|---|---|---|---|---|
|  |  |  |  | Ethanol (g) | Deionized water (g) |
| 1st Layer | 100 | 2478 | 45.8 | 118 | 45.8 |
| 3rd Layer | 100 | 2478 | 47.3 | 118 | 47.3 |
| 5th Layer | 100 | 2478 | 48.8 | 118 | 48.8 |
| 7th Layer | 100 | 2478 | 50.4 | 118 | 50.4 |
| 9th Layer | 100 | 2478 | 52.1 | 118 | 52.1 |
| 11th Layer | 100 | 2478 | 53.8 | 118 | 53.8 |

TABLE 3-2

Starting material composition for red powder (silica layer)

|  | Powder (g) | Ethanol (g) | TEOT (g) | Dropped solution | |
|---|---|---|---|---|---|
|  |  |  |  | Ammonia water (g) | Deionized water (g) |
| 2nd Layer | 100 | 793 | 30 | 64.4 | 40 |
| 4th Layer | 100 | 793 | 30 | 65.5 | 40 |
| 6th Layer | 100 | 793 | 30 | 66.6 | 40 |
| 8th Layer | 100 | 793 | 30 | 67.7 | 40 |
| 10th Layer | 100 | 793 | 30 | 68.8 | 40 |

TABLE 3-3

Thickness and refractive index of each layer in red powder

| | Thickness (nm) | Refractive index | | Thickness (nm) | Refractive index |
|---|---|---|---|---|---|
| 1st Layer | 71.8 | 2.1 | 7th Layer | 103.3 | 2.1 |
| 2nd Layer | 98.2 | 1.45 | 8th Layer | 77.5 | 1.45 |
| 3rd Layer | 73.6 | 2.1 | 9th Layer | 105.8 | 2.1 |
| 4th Layer | 99.9 | 1.45 | 10th Layer | 79.2 | 1.45 |
| 5th Layer | 75.4 | 2.1 | 11th Layer | 108.3 | 2.1 |
| 6th Layer | 101.0 | 1.45 | | | |

EXAMPLE 4

Primary color of light 4: blue:
First layer, Silica film:

To 100 g of a carbonyl iron metal powder (average particle diameter, 3 μm) was added 793 g of ethanol to disperse the powder. Thereto were added 30 g of silicon ethoxide, 38 g of ammonia water (29%), and 40 g of water. The resultant mixture was reacted for 6 hours with stirring. After completion of the reaction, the solid matter was washed with a sufficient amount of ethanol with decantation, taken out by filtration, subsequently vacuum-dried at 180° C. for 8 hours, and then heated with a rotary tubular oven at 500° C. for 2 hours. As a result, silica-coated powder 1B was obtained.

Second layer: Titania film:

Into 2,478 g of ethanol was dispersed 40 g of the silica-coated powder 1B together with 16.8 g of titanium isopropoxide. While the contents and the vessel were held at 25° C., a solution prepared beforehand by mixing 16.8 g of deionized water with 118 g of ethanol was added dropwise to the above solution with stirring over 1 hour. Thereafter, the resultant mixture was reacted for 6 hours.

After completion of the reaction, the solid matter was washed with a sufficient amount of ethanol with decantation, taken out by filtration, subsequently vacuum-dried at 180° C. for 8 hours, and then heated with a rotary tubular oven at 500° C. for 2 hours.

The third and subsequent layers were formed in the order of silica/titania/silica/titania under the conditions shown in Tables 4-1 and 4-2 to thereby form eight layers in total.

Figure 6:
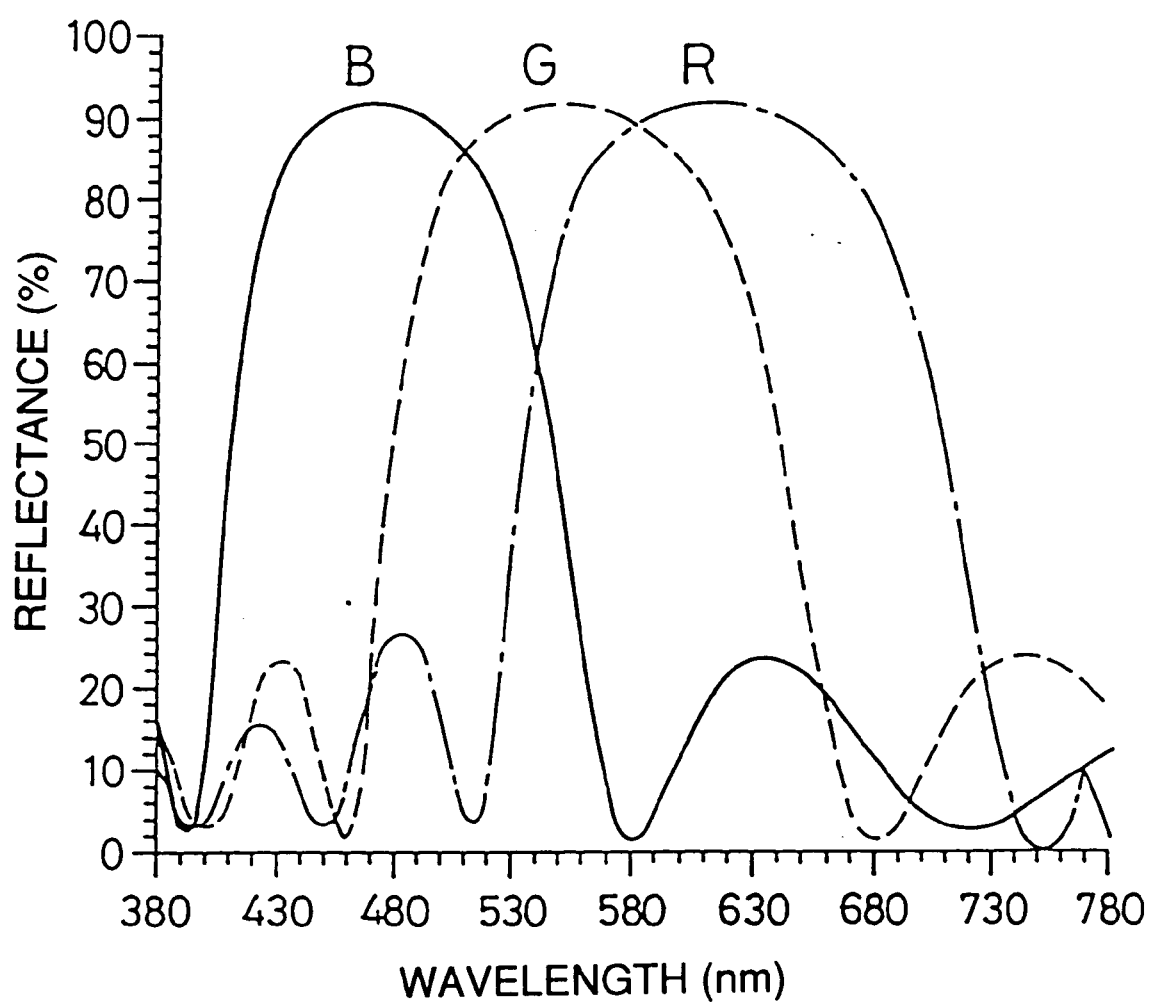
FIG. 6 is a drawing showing spectral curves of the pigments respectively obtained in Examples 4 to 6 according to the present invention.

The powder after eighth-layer coating had a reflection peak at 470 nm with a reflectance of 90%. The powder obtained had a spectral curve shown in FIG. 6 B.

The refractive index and thickness of each layer which were determined through computer calculations are shown in Table 4-3.

TABLE 4-1

Starting material composition for blue powder (silica layer)

|  | Powder (g) | Ethanol (g) | TEOT (g) | Dropped solution | |
|---|---|---|---|---|---|
|  |  |  |  | Ammonia water (g) | Deionized water (g) |
| 1st Layer | 100 | 793 | 30 | 38.0 | 40 |
| 3rd Layer | 100 | 793 | 30 | 38.6 | 40 |
| 5th Layer | 100 | 793 | 30 | 39.3 | 40 |
| 7th Layer | 100 | 793 | 30 | 39.9 | 40 |

TABLE 4-2

Starting material composition for blue powder (titania layer)

|  | Powder (g) | Ethanol (g) | TEOT (g) | Dropped solution | |
|---|---|---|---|---|---|
|  |  |  |  | Ethanol (g) | Deionized water (g) |
| 2nd Layer | 100 | 2478 | 16.8 | 118 | 16.8 |
| 4th Layer | 100 | 2478 | 17.1 | 118 | 17.1 |
| 6th Layer | 100 | 2478 | 17.4 | 118 | 17.4 |
| 8th Layer | 100 | 2478 | 17.7 | 118 | 17.7 |

TABLE 4-3

Thickness and refractive index of each layer in blue powder

| | Thickness (nm) | Refractive index | | Thickness (nm) | Refractive index |
|---|---|---|---|---|---|
| 1st Layer | 74.5 | 1.45 | 5th Layer | 77.0 | 1.45 |
| 2nd Layer | 53.3 | 2.1 | 6th Layer | 55.1 | 2.1 |
| 3rd Layer | 75.8 | 1.45 | 7th Layer | 78.3 | 1.45 |
| 4th Layer | 54.2 | 2.1 | 8th Layer | 56.0 | 2.1 |

EXAMPLE 5

Primary color of light 4: green:
First layer, Silica film:

To 100 g of a carbonyl iron metal powder (average particle diameter, 3 μm) was added 793 g of ethanol to disperse the powder. Thereto were added 30 g of silicon ethoxide, 46 g of ammonia water (29%), and 40 g of water. The resultant mixture was reacted for 6 hours with stirring. After completion of the reaction, the solid matter was washed with a sufficient amount of ethanol with decantation, taken out by filtration, subsequently vacuum-dried at 180° C. for 8 hours, and then heated with a rotary tubular oven at 500° C. for 2 hours. As a result, silica-coated powder 1G was obtained.

Second layer: Titania film:

Into 2,478 g of ethanol was dispersed 40 g of the silica-coated powder 1G together with 19.3 g of titanium isopropoxide. While the contents and the vessel were held at 25° C., a solution prepared beforehand by mixing 19.3 g of deionized water with 118 g of ethanol was added dropwise to the above solution with stirring over 1 hour. Thereafter, the resultant mixture was reacted for 6 hours.

After completion of the reaction, the solid matter was washed with a sufficient amount of ethanol with decantation, taken out by filtration, subsequently vacuum-dried at 180° C. for 8 hours, and then heated with a rotary tubular oven at 500° C. for 2 hours.

As a result, silica/titania-coated iron powder 1G was obtained.

The third and subsequent layers were formed in the order of silica/titania/silica/titania under the conditions shown in Tables 5-1 and 5-2 to thereby form eight layers in total.

The powder after eighth-layer coating had a reflection peak at 540 nm with a reflectance of 90%. The powder obtained had a spectral curve shown in FIG. 6 G.

The refractive index and thickness of each layer which were determined through computer calculations are shown in Table 5-3.

TABLE 5-1

Starting material composition for green powder (silica layer)

|  | Powder (g) | Ethanol (g) | TEOT (g) | Dropped solution Ammonia water (g) | Deionized water (g) |
|---|---|---|---|---|---|
| 1st Layer | 100 | 793 | 30 | 46.0 | 40 |
| 3rd Layer | 100 | 793 | 30 | 46.8 | 40 |
| 5th Layer | 100 | 793 | 30 | 47.6 | 40 |
| 7th Layer | 100 | 793 | 30 | 48.4 | 40 |

TABLE 5-2

Starting material composition for green powder (titania layer)

|  | Powder (g) | Ethanol (g) | TEOT (g) | Dropped solution Ethanol (g) | Deionized water (g) |
|---|---|---|---|---|---|
| 2nd Layer | 100 | 2478 | 19.3 | 118 | 19.3 |
| 4th Layer | 100 | 2478 | 19.6 | 118 | 19.6 |
| 6th Layer | 100 | 2478 | 20.0 | 118 | 20.0 |
| 8th Layer | 100 | 2478 | 20.3 | 118 | 20.3 |

TABLE 5-3

Thickness and refractive index of each layer in green powder

|  | Thickness (nm) | Refractive index |  | Thickness (nm) | Refractive index |
|---|---|---|---|---|---|
| 1st Layer | 85.4 | 1.45 | 5th Layer | 88.4 | 1.45 |
| 2nd Layer | 61.0 | 2.1 | 6th Layer | 63.2 | 2.1 |
| 3rd Layer | 86.9 | 1.45 | 7th Layer | 90.0 | 1.45 |
| 4th Layer | 62.1 | 2.1 | 8th Layer | 64.3 | 2.1 |

EXAMPLE 6

Primary color of light 4: red:
First layer: Silica film:

To 100 g of a carbonyl iron metal powder (average particle diameter, 3 μm) was added 793 g of ethanol to disperse the powder. Thereto were added 30 g of silicon ethoxide, 44 g of ammonia water (29%), and 40 g of water. The resultant mixture was reacted for 6 hours with stirring. After completion of the reaction, the solid matter was washed with a sufficient amount of ethanol with decantation, taken out by filtration, subsequently vacuum-dried at 180° C. for 8 hours, and then heated with a rotary tubular oven at 500° C. for 2 hours. As a result, silica-coated powder 1R was obtained.

Second layer: Titania film:

Into 2,478 g of ethanol was dispersed 40 g of the silica-coated powder 1R together with 26.0 g of titanium isopropoxide. While the contents and the vessel were held at 25° C., a solution prepared beforehand by mixing 26.8 g of deionized water with 118 g of ethanol was added dropwise to the above solution with stirring over 1 hour. Thereafter, the resultant mixture was reacted for 6 hours.

After completion of the reaction, the solid matter was washed with a sufficient amount of ethanol with decantation, taken out by filtration, subsequently vacuum-dried at 180° C. for 8 hours, and then heated with a rotary tubular oven at 500° C. for 2 hours.

As a result, silica/titania-coated iron powder was obtained.

The third and subsequent layers were formed in the order of silica/titania/silica/titania under the conditions shown in Tables 6-1 and 6-2 to thereby form eight layers in total.

The powder after eighth-layer coating had a reflection peak at 610 nm with a reflectance of 90%. The powder obtained had a spectral curve shown in FIG. 6 R.

The refractive index and thickness of each layer which were determined through computer calculations are shown in Table 6-3.

TABLE 6-1

Starting material composition for red powder (silica layer)

|  | Powder (g) | Ethanol (g) | TEOT (g) | Dropped solution Ammonia water (g) | Deionized water (g) |
|---|---|---|---|---|---|
| 1st Layer | 100 | 793 | 30 | 50.0 | 40 |
| 3rd Layer | 100 | 793 | 30 | 50.9 | 40 |
| 5th Layer | 100 | 793 | 30 | 51.8 | 40 |
| 7th Layer | 100 | 793 | 30 | 52.7 | 40 |

TABLE 6-2

Starting material composition for red powder (titania layer)

|  | Powder (g) | Ethanol (g) | TEOT (g) | Dropped solution Ethanol (g) | Deionized water (g) |
|---|---|---|---|---|---|
| 2nd Layer | 100 | 2478 | 21.8 | 118 | 21.8 |
| 4th Layer | 100 | 2478 | 22.0 | 118 | 22.0 |
| 6th Layer | 100 | 2478 | 22.6 | 118 | 22.6 |
| 8th Layer | 100 | 2478 | 23.0 | 118 | 23.0 |

TABLE 6-3

Thickness and refractive index of each layer in red powder

|  | Thickness (nm) | Refractive index |
|---|---|---|
| 1st Layer | 96.5 | 1.45 |
| 2nd Layer | 61.0 | 2.1 |

TABLE 6-3-continued

Thickness and refractive index of each layer in red powder

| | Thickness (nm) | Refractive index |
|---|---|---|
| 3rd Layer | 98.2 | 1.45 |
| 4th Layer | 62.1 | 2.1 |
| 5th Layer | 99.9 | 1.45 |
| 6th Layer | 63.2 | 2.1 |
| 7th Layer | 101.7 | 1.45 |
| 8th Layer | 64.3 | 2.1 |

INDUSTRIAL APPLICABILITY

According to the present invention, additive pigments of satisfactory quality are obtained. By mixing the pigment powders of the three primary colors, a bright pigment powder having a high whiteness can be obtained.

Furthermore, additive pigments of satisfactory quality which respectively are a green pigment, a blue pigment, and a red pigment can be obtained.

In addition, in producing these pigment powders, it is possible to obtain a pigment powder having an even light intensity over the wavelength range corresponding to a target color (having a box-shape curve) by designing the material and thickness of each layer of a multilayered coating film. Consequently, pigment powders which each has a desired color and is bright can be obtained.

According to the present invention, a light-resistant magnetic color toner powder and a technique for producing the same can be provided.

By forming an interference multilayered coating on glass beads, a magnetic color toner or a magnetic color ink can be produced without the necessity of any colorant. These beads provide distinct retroreflective pigments.

What is claimed is:

1. An additive pigment powder comprising three pigments respectively having the three primary colors of light (red, green, and blue), wherein each of the pigments is comprised of a base material having thereon plural metal oxide films differing in refractive index and having a predetermined thickness based on Fresnel interference, wherein the respective pigment particles having the three primary colors of light reflect visible light only with a specified wavelength range and intensity corresponding to one of red, green and blue, each of the pigments having a box-shaped spectral distribution in said specific wavelength range, and a desired bright intermediate color can be developed by mixing these pigment particles having the three primary colors in an appropriate proportion.

2. An additive pigment powder comprising a base material having thereon plural metal oxide films differing in refractive index and having a predetermined thickness based on Fresnel interference, and having blue color among the three primary colors of light, which has a peak having a light reflectance of 80% or higher in a spectral wavelength range of 380 nm to 500 nm, and has a reflection range having a light reflectance of 80% or higher within 30 to 50 nm at both sides of the peak wavelength.

3. An additive pigment powder comprising a base material having thereon plural metal oxide films differing in refractive index and having a predetermined thickness based on Fresnel interference, and having green color among the three primary colors of light, which has a peak having a light reflectance of 80% or higher in a spectral wavelength range of 500 nm to 575 nm, and has a reflection range having a light reflectance of 80% or higher within 30 to 50 nm at both sides of the peak wavelength.

4. An additive pigment powder comprising a base material having thereon plural metal oxide films differing in refractive index and having a predetermined thickness based on Fresnel interference, and having red color among the three primary colors of light, which has a peak having a light reflectance of 80% or higher in the spectral wavelength range of 575 nm to 750 nm, and has a reflection range having a light reflectance of 80% or higher within 30 to 50 nm at both sides of the peak wavelength.

5. The additive pigment powder according to any one of claims 1 to 5, wherein the pigment powder comprises a base particle having thereon a multilayered film, and any adjacent films of the multilayered film and the base particle differ from each other in material and in refractive index to make the pigment particle have a color due to interference of waves reflected or transmitted by between the films of the multilayered film.

6. The added pigment powder according to claim 1, wherein adjacent plural metal oxide films and the base material of the respective pigment particles differ from each other in material and in refractive index, to thereby assume a color due to interference of light waves reflected or transmitted by the constituent metal oxide films.

* * * * *